Patented Apr. 22, 1930

1,755,871

UNITED STATES PATENT OFFICE

WALTER DUISBERG, OF LEVERKUSEN, AND WINFRID HENTRICH AND LUDWIG ZEH, OF WIESDORF, NEAR COLOGNE, GERMANY, ASSIGNORS TO GENERAL ANILINE WORKS, INC., OF NEW YORK, N. Y., A CORPORATION OF DELAWARE

MONOAZO DYESTUFF PRODUCED FROM AMINOBENZYL-ω-SULFONIC ACID AND ACID SUBSTITUTED AROMATIC AMINES

No. Drawing. Original application filed February 12, 1926, Serial No. 87,959, and in Germany February 19, 1925. Divided and this application filed February 12, 1926. Serial No. 87,958.

The present invention relates to the new azo dyestuffs of the general formula:

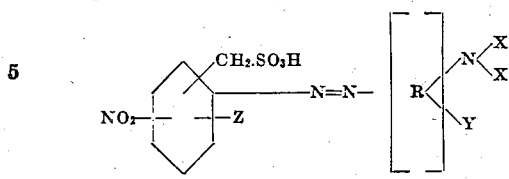

wherein R represents a nucleus of the group including the benzene and naphthalene series; X represents hydrogen, alkyl, aryl or aralkyl, Y represents a sulfonic acid, carboxylic acid or hydroxyl group, and Z represents hydrogen or a nitro group. The dyestuffs are obtained by diazotizing a compound of the general formula:

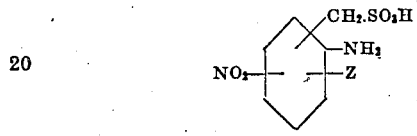

wherein Z stands for hydrogen or a nitro group, and coupling the diazo compound thus obtained with a compound of the general formula:

wherein R represents a nucleus of the group including the benzene and naphthalene series and X represents hydrogen, alkyl, aryl or aralkyl and Y represents a sulfonic acid, carboxylic acid or hydroxyl group. The dyestuffs of this series are very useful and are especially adapted for dyeing wool.

If the diazo compounds of nitrated aminobenzyl-ω-sulfonic acids are coupled with sulfonated or carboxylated-2-naphthylamines or a substitution product thereof, or with 2-amino-hydroxynaphthalenes or their sulfonic acids or substitution products, dyestuffs are obtained which dye wool from an acid bath in bluish-red to blue-black shades. These dyestuffs possess very valuable properties of fastness.

This class of dyestuffs is illustrated by the following examples:

Example 1

249 parts by weight of the ammonium salt of 5-nitro-2-aminobenzyl-ω-sulfonic acid are diazotized in an aqueous solution with 69 parts by weight of sodium nitrite and hydrochloric acid. The diazo solution is added to an aqueous solution of 237 parts by weight of 2-methylaminonaphthalene-7-sulfonic acid. After the coupling is complete the dyestuff is washed with a weakly alkaline solution. It is obtained in a beautifully crystalline form. It dyes wool from an acid bath very clear, uniform, reddish-violet shades which are very fast to light. The dyestuff, in the form of its sodium salt, has most probably the structural formula:

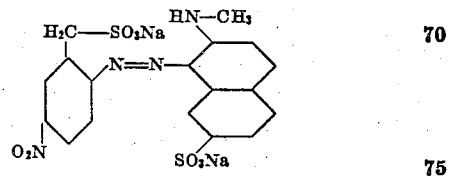

Example 2

277 parts by weight of 3.5-dinitro-2-aminobenzyl-ω-sulfonic acid are diazotized and the diazo compound is added to an aqueous solution of 253 parts by weight of 2-methylamino-8-naphthol-6-sulfonic acid containing sodium acetate. The dyestuff is converted in the usual manner into its sodium salt, which dyes wool in level, blue shades of good fastness to light and fulling. The sodium salt of the dyestuff has most probably the structural formula:

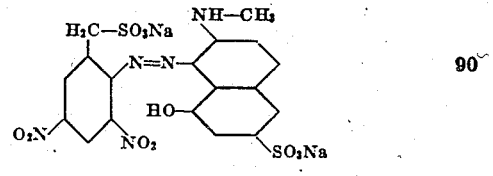

Example 3

277 parts by weight of 3.5-dinitro-2-aminobenzyl-ω-sulfonic acid are diazotized. The diazo compound is added to an aqueuos solution of 209 parts by weight of the sodium salt of 2-naphthylamine-3-carboxylic acid.

The dyestuff is worked up in the usual manner. It dyes wool clear, level, reddish-violet shades of good fastness to light and fulling. The sodium salt of the dyestuff has most probably the structural formula:

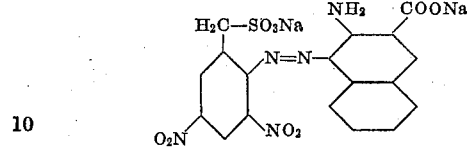

Example 4

277 parts by weight of 3.5-dinitro-2-aminobenzyl-ω-sulfonic acid are diazotized. The diazo compound is added to an aqueous solution of 195 parts by weight of 2-amino-8-naphthol which has been made acid with hydrochloric acid. The dyestuff is worked up in the well known way. It dyes wool in very level blue-black shades of good light-fastness. The sodium salt of the dyestuff has most probably the structural formula:

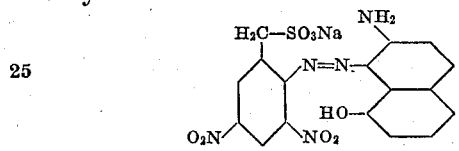

Example 5

294 parts by weight of the ammonium salt of 3.5-dinitro-4-aminobenzyl-ω-sulfonic acid are diazotized. The diazo compound is added to an aqueous solution of 251 parts by weight of 2-ethylaminonaphthalene-7-sulfonic acid. The dyestuff is worked up in the usual manner. It dyes wool level Bordeaux shades of excellent fastness to light and fulling. The ammonium salt of the dyestuff has most probably the structural formula:

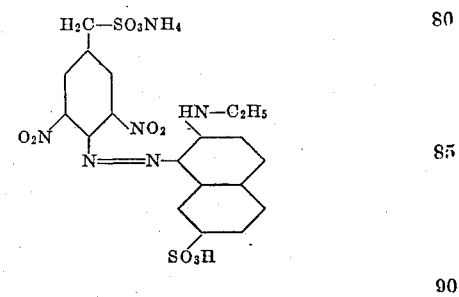

Additional examples are given in the following table:

| Diazo compound from— | Coupled with— | Shades of the dyestuffs |
| --- | --- | --- |
| 5-nitro-2-aminobenzyl-ω-sulfonic acid | 2-amino-8-naphthol-6-sulfonic acid | Violet. |
| 5-nitro-2-aminobenzyl-ω-sulfonic acid | 2-methylamine-8-naphthol-6-sulfonic acid | Bluish-violet. |
| 3.5-dinitro-2-aminobenzyl-ω-sulfonic acid | 2-methylaminonaphthalene-7-sulfonic acid | Clear bluish-violet. |
| 3.5-dinitro-2-aminobenzyl-ω-sulfonic acid | 2-naphthylamine-6-sulfonic acid | Bordeaux. |
| 3.5-dinitro-2-aminobenzyl-ω-sulfonic acid | Phenyl-2-naphthylamine-6-sulfonic acid | Violet. |

The dyestuff, in the form of its sodium salt, has most probably the structural formula:

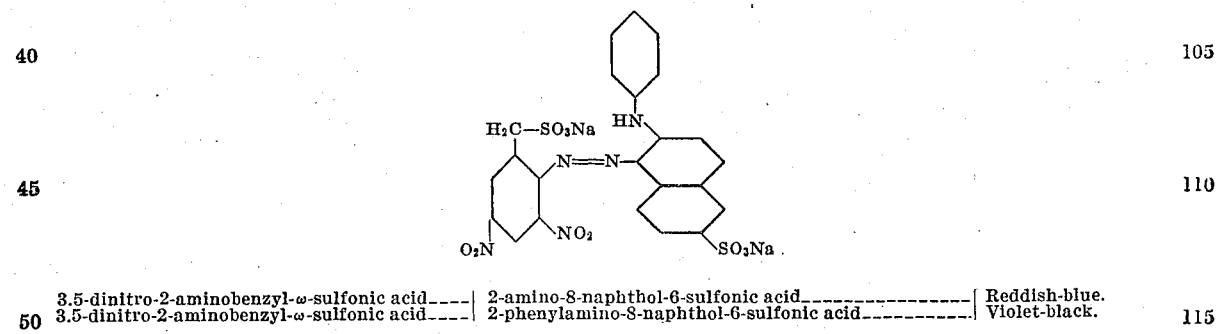

| 3.5-dinitro-2-aminobenzyl-ω-sulfonic acid | 2-amino-8-naphthol-6-sulfonic acid | Reddish-blue. |
| --- | --- | --- |
| 3.5-dinitro-2-aminobenzyl-ω-sulfonic acid | 2-phenylamino-8-naphthol-6-sulfonic acid | Violet-black. |

The dyestuff, in the form of its sodium salt, has most probably the structural formula:

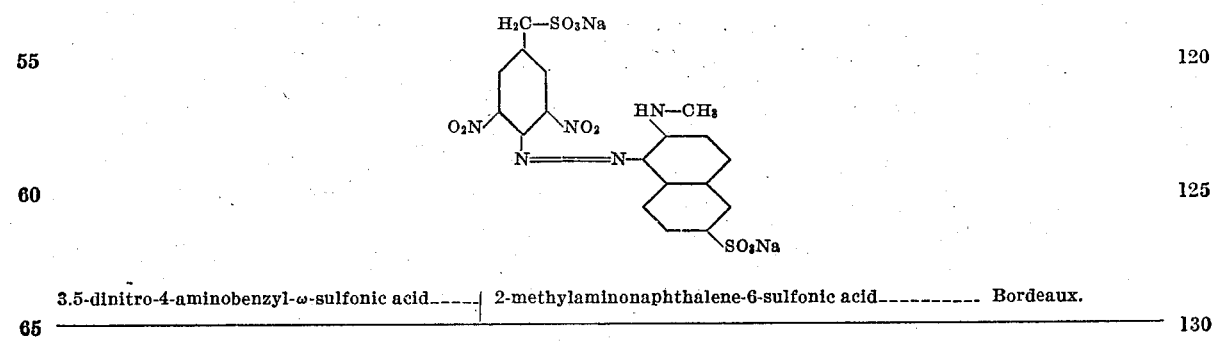

| 3.5-dinitro-4-aminobenzyl-ω-sulfonic acid | 2-methylaminonaphthalene-6-sulfonic acid | Bordeaux. |
| --- | --- | --- |

This application is a division of our parent application, Serial No. 87,959.

We claim:—

1. As new products the compounds of the general formula:

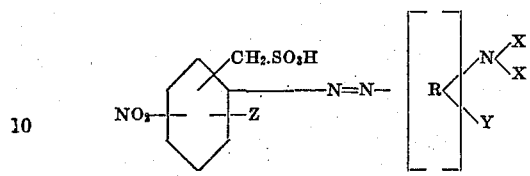

wherein R represents a nucleus of the group including the benzene and naphthalene series and X represents hydrogen, alkyl, aryl or aralkyl, Y represents a sulfonic acid, carboxylic acid or hydroxyl group and Z represents hydrogen or a nitro group.

2. As new products the compounds of the general formula:

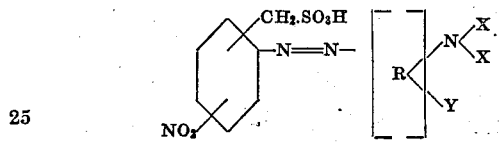

wherein R represents a nucleus of the group including the benzene and naphthalene series and X represents hydrogen, alkyl, aryl or aralkyl and Y represents a sulfonic acid, carboxylic acid or hydroxyl group.

3. As new products the compounds of the general formula:

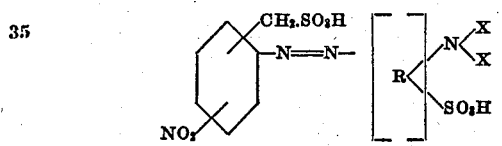

wherein R represents a nucleus of the group including the benzene and naphthalene series and X represents hydrogen, alkyl, aryl or aralkyl.

4. As new products the compounds of the general formula:

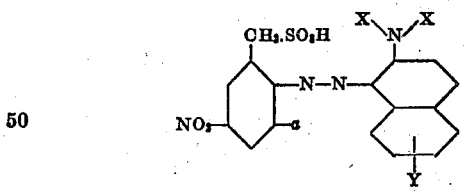

wherein X represents hydrogen, alkyl, aryl or aralkyl and Y represents a sulfonic acid, carboxylic acid or hydroxyl group and "a" represents hydrogen or a nitro group.

5. As new products the compounds of the general formula:

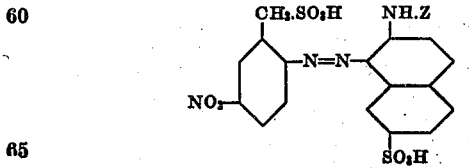

wherein Z stands for hydrogen, a methyl or ethyl group.

6. As a new product the compound of the probable formula:

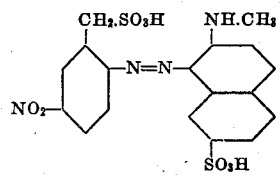

dyeing wool from an acid bath, clear, uniform, reddish-violet shades which are very fast to light.

7. As new products wool material dyed with the monoazo dyestuffs defined in claim 1.

8. As new products wool material dyed with the monoazo dyestuffs defined in claim 2.

9. As new products wool material dyed with the monoazo dyestuffs defined in claim 3.

10. As new products wool material dyed with the monoazo dyestuffs defined in claim 4.

11. As new products wool material dyed with the monoazo dyestuffs defined in claim 5.

12. As a new product wool material dyed with diazo dyestuff defined in claim 6.

In testimony whereof we have hereunto set our hands.

WALTER DUISBERG.
WINFRID HENTRICH.
LUDWIG ZEH.